United States Patent [19]
DeMarco

[11] Patent Number: 5,095,650
[45] Date of Patent: Mar. 17, 1992

[54] APPARATUS FOR STIMULATING PLANT GROWTH THAT CAN BE SHIPPED FULLY ASSEMBLED

[75] Inventor: Jeffery J. DeMarco, Rancho Santa Fe, Calif.

[73] Assignee: Pyraponic Industries, Inc. II, Carmel Mountain Ranch, Calif.

[21] Appl. No.: 457,017

[22] Filed: Dec. 26, 1989

[51] Int. Cl.⁵ .............................................. A01G 9/00
[52] U.S. Cl. .................................... 47/60; 47/DIG. 6; 47/17
[58] Field of Search ........................ 47/17–19, 47/26, 39, 63, 66, 76, 60, DIG. 6; 248/50, 74.2, 231.8

[56] References Cited

U.S. PATENT DOCUMENTS

| 3,441,986 | 8/1967 | Pritchard | 248/74.2 |
| 4,804,166 | 2/1989 | Makus | 248/231.8 |
| 4,840,334 | 6/1989 | Kikuchi | 248/74.2 |
| 4,850,135 | 6/1989 | DeMarco | 47/17 |

*Primary Examiner*—David A. Scherbel
*Assistant Examiner*—Michele A. Van Patten
*Attorney, Agent, or Firm*—Lewis H. Eslinger; Donald D. Dowden

[57] ABSTRACT

Apparatus is provided comprising a housing for growing plants under controlled conditions. The housing is defined by a base, walls and a cap. Electrical sockets are mounted in the housing, and fluorescent lamps are electrically connected to the sockets. Supports connected to the wall in spaced-apart relation to the sockets are releasably engageable with the fluorescent lamps for support thereof. A typical wall is formed with a recess having a given length in a first direction. The support is made of a flexible material and is formed with a stem, clips extending from one side of the stem for embracing and supporting the fluorescent light, and a head extending from another side of the stem and engageable in the recess. Arms lead away from the head and wall at first locations adjacent to and on either side of the stem and towards the wall at second locations farther from and on either side of the stem. Feet are respectively at distal ends of the arms and engageable in the recess. The feed have a separation in the first direction normally slightly different from the given length and are resiliently biased by the arms for retention in the recess. At least one of the head and feet are received in the recess with a small tolerance in a direction orthogonal to the first direction.

7 Claims, 3 Drawing Sheets

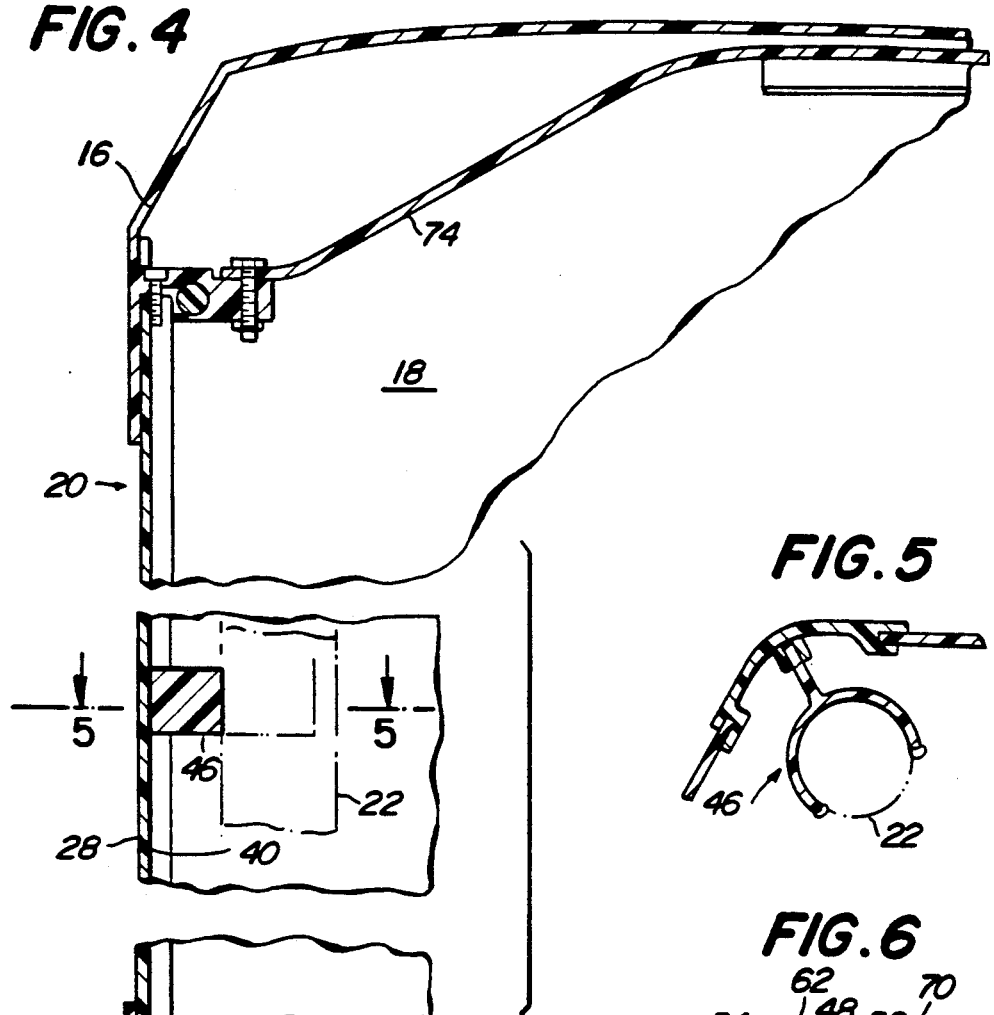

APPARATUS FOR STIMULATING PLANT GROWTH THAT CAN BE SHIPPED FULLY ASSEMBLED

BACKGROUND OF THE INVENTION

1. Field of the Invention

This invention relates to apparatus for stimulating plant growth under controlled conditions and, more particularly, to novel and highly-effective apparatus that is better adapted than prior apparatus to be shipped in a fully assembled state from the factory to the consumer.

2. Description of the Prior Art

The prior art that is the most relevant to the present invention is apparatus the utilitarian features of which are best disclosed in applicant's U.S. Pat. No. 4,850,135, issued July 25, 1989, and the aesthetic features of which are best illustrated in applicant's related design U.S. Pat. Application Ser. No. 07/160,924, filed Feb. 26, 1988.

Applicant's prior apparatus as disclosed in these documents is sold for the purpose of stimulating plant growth under controlled conditions. The apparatus comprises a housing having a lower base portion, an upper cap portion, a hollow interior in which plants are grown and an exterior. Fluorescent lamps mounted within the interior stimulate growth of the plants. The housing is formed with vacuum-metalized walls or panels which, when illuminated by the lamps, reflect a major proportion of light into the interior. The housing is further formed with a lower vent and an upper vent to facilitate. circulation of air through the interior. The lower vent substantially surrounds the lower portion of the housing and the upper vent substantially surrounds the upper portion of the housing to optimize the flow of air. The lower and upper vents are formed and located with respect to the lamps and walls so as substantially to block passage of light through the vents from the interior to the exterior.

It is believed that applicant's prior apparatus as disclosed in the cited documents is the most advanced, sophisticated and successful laboratory apparatus that has been developed heretofore for the purpose of maximizing the production of plants per unit of space-time, minimizing the inter-nodal length between budding sites, and optimizing the "root-to-shoot-to-fruit ratio." It facilitates performing carefully controlled experiments relating to plant physiology and enables regulating and optimizing the conditions of plant growth.

While the apparatus performs flawlessly when manufactured and assembled at the factory, it is necessary, in order to maximize the benefits of the apparatus in laboratories throughout the nation and throughout the world, to ship the apparatus over great distances.

This presents two choices, neither wholly satisfactory in view of the state of the art prior to the present invention.

A first possibility is to ship the apparatus in a fully assembled state from the factory to the end user. It is possible in this way to ensure that the apparatus is assembled and adjusted in accordance with the highest standards prior to shipment. It is not possible, however, to control the handling of the apparatus by the shipping company. It must anticipated on the basis of wide experience that a certain percentage of shipments will be badly handled. Specifically, the apparatus may be dropped or shipped on its side or upside down, regardless of special-handling labels that may be applied to its packaging.

It is not a complete solution to this problem to provide a rugged shipped container. This is precision laboratory apparatus that may stand a meter or more in height and that has significant amounts of delicate electrical equipment, fluorescent lamps, etc., and is subject to damage from inertial forces even if the packaging is state-of-the-art. The fluorescent lamps in particular are subject to breakage. For reasons explained in the patent referred to above, the fluorescent lamps are U-shaped. They are plugged in at the open ends of the U, and the other end, which contains the U bend, is not well supported. The lamps are mounted essentially in cantilever fashion.

There is thus a considerable mass at a considerable distance from the fulcrum represented by the sockets into which the lamps is plugged. A substantial moment is therefore developed about the fulcrum because of the weight of the lamps when the apparatus is tipped on its side. It is compounded if the apparatus is dropped so that it lands on its side. In such a case, even with the best packaging, the fluorescent lamps are apt to be broken.

The foregoing argues against shipping the apparatus in a fully assembled state and suggests the possibility of shipping the apparatus in a disassembled state, each component being carefully packaged to avoid breakage or other damage during shipment. It is possible in this way to ensure with a high degree of probability that all of the components will arrive in good condition for assembly.

However, as noted above, this is precision laboratory apparatus and is ideally assembled and adjusted in the factory. Most end users lack the training and sophistication to assemble such apparatus in a manner that ensures that it will perform to its design specifications. Moreover, the apparatus includes electrical components, and the plants grown in it must be watered. The electrical components must be assembled in such a manner as to minimize the probability of contact with water. The hazard to the consumer that will result from improper assembly is potentially very serious and even fatal.

Even laboratory technicians may lack the training and sophistication to assemble the apparatus properly. The apparatus is used in botanical laboratories by users who may be highly trained in plant physiology but in general are not highly trained in the assembly of electronic apparatus.

It may be assumed at first blush that a solution to the problem is to establish a worldwide distribution and warehousing network such that the apparatus can be shipped disassembled to a distribution warehouse that is manned by personnel who have the requisite expertise to assemble the apparatus for the end user. This however does not avoid the need to ship the apparatus after its assembly from the warehouse to end user. It also complicates the problem of quality control, since the same high standards maintained at the factory must now be maintained at numerous worldwide locations.

OBJECTS AND SUMMARY OF THE INVENTION

An object of the invention is to remedy the problems of the prior art outlined above. In particular, an object of the invention is to provide apparatus that can be shipped in a fully assembled state from the factory to the consumer with a high degree of assurance that the apparatus will arrive in good condition despite mishandling by the shipping company.

Another object of the invention to provide apparatus to the end user that is assembled in accordance with the highest factory specifications despite the inclusion in the apparatus of fluorescent tubes and other electrical components that are easily damage by rough handling.

The foregoing and other objects are attained in accordance with the invention by providing, in apparatus comprising a housing for growing plants under controlled conditions, the housing being defined by base means, wall means and cap means; electrical socket means mounted in the housing means; fluorescent light means connected to the socket means; and support means connected to the wall means in spaced-apart relation to the socket means and releasably engageable with the fluorescent light means for support thereof; the improvement wherein: the wall means is formed with recess means having a given length in a first direction; the support means is made of a flexible material and is formed with stem means, clip means extending from one side of the stem means for embracing and supporting the fluorescent means, a head extending from another side of the stem means and engageable in the recess means, a pair of arms leading away from the head and wall means at first locations adjacent to and on either side of the stem means and towards the wall means at second locations farther from and on either side of the stem means, and a pair of feet respectively at distal ends of the arms and engageable in the recess means, the feet having a separation in said first direction normally slightly different from said given length and being resiliently biased by said arms for retention in said recess means and at least one of said head and said feet being received in said recess means with a small tolerance in a direction orthogonal to the first direction.

BRIEF DESCRIPTION OF THE DRAWINGS

A better understanding of the objects, features and advantages of the invention can be gained from a consideration of the following detailed description of the preferred embodiments thereof, throughout which the same reference characters designate the same elements and parts, and wherein:

FIG. 4 is a sectional view taken along the line 4—4 of FIG. 2 and looking in the direction of the arrows;

FIG. 5 is a sectional view taken along the line 5—5 of FIG. 4 and looking in the direction of the arrow;

FIG. 6 is a view corresponding to FIG. 5 showing a preferred embodiment of the present invention; and FIG. 7 is a sectional view corresponding to detail A of FIG. 4 and showing a modification thereof in accordance with the invention.

DESCRIPTION OF THE PREFERRED EMBODIMENTS

Figure 1:
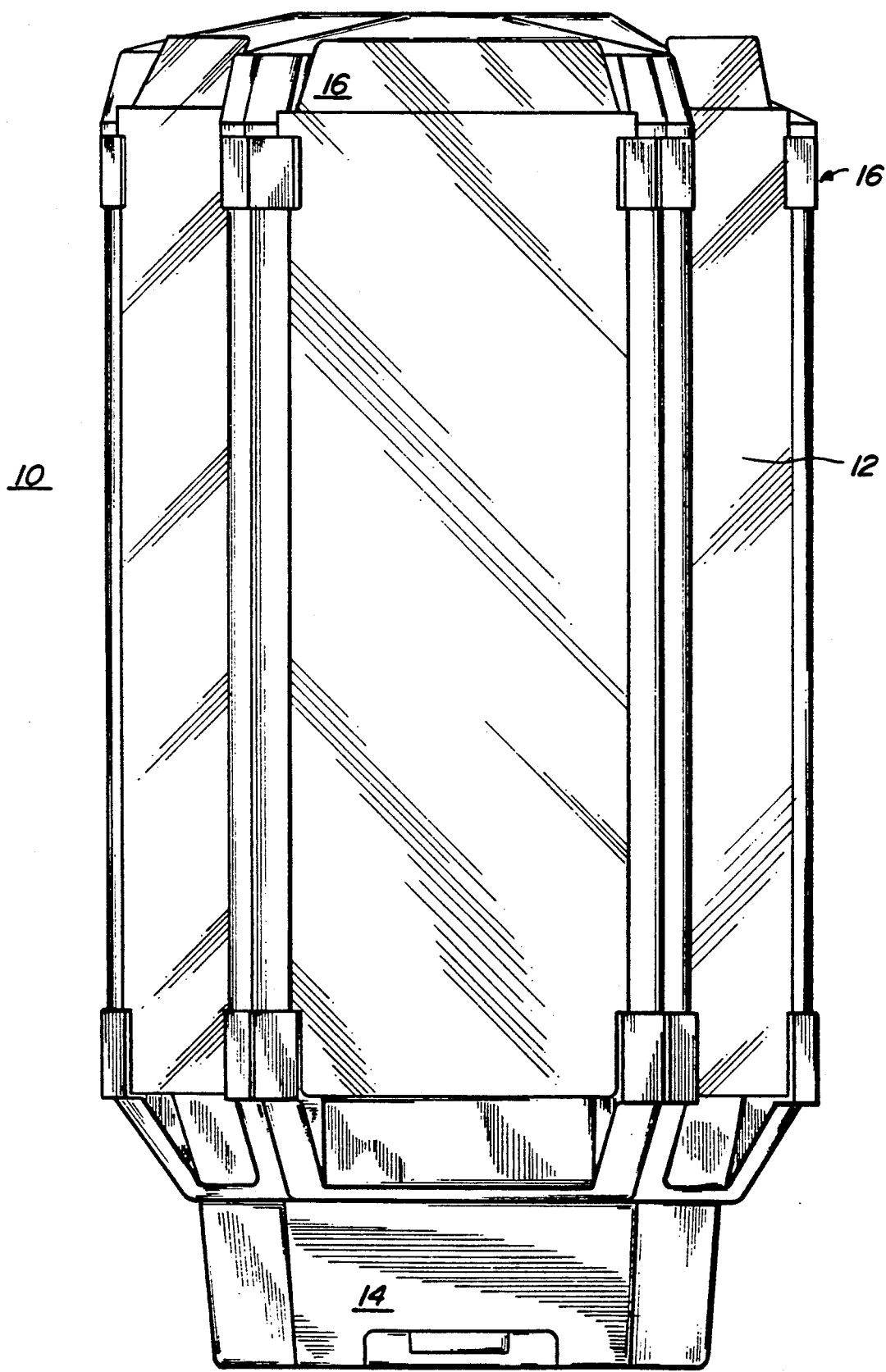
FIG. 1 is a view in front elevation of apparatus to which the present invention can be applied.
Figure 2:
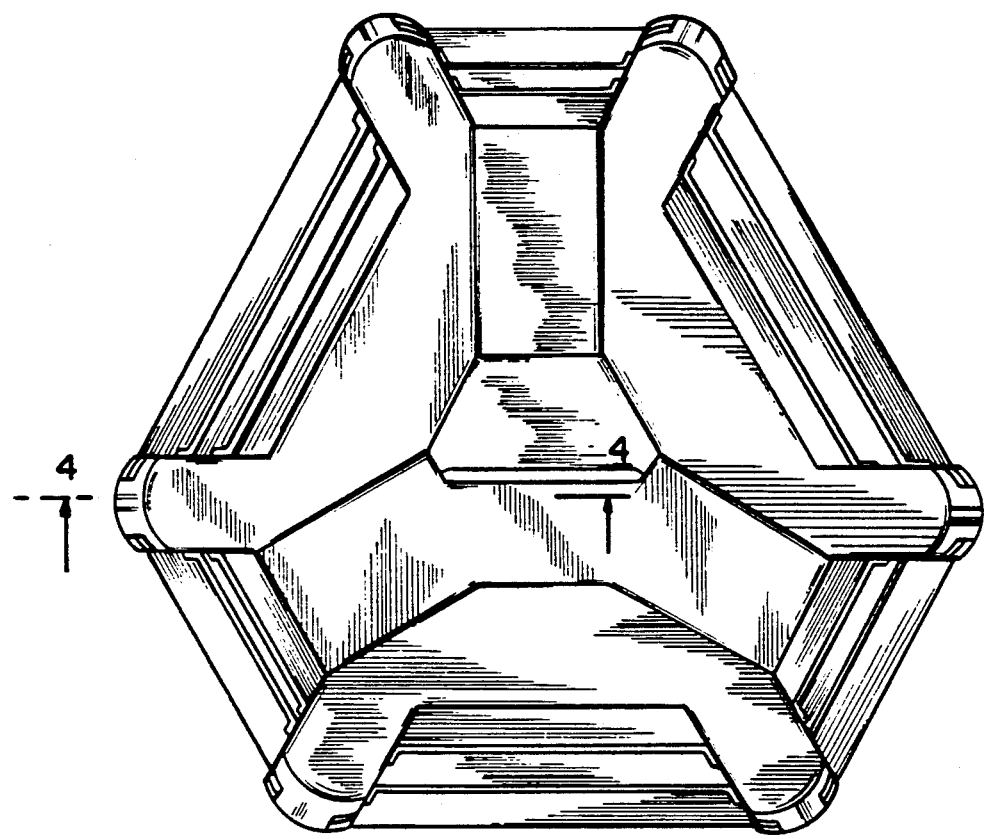
FIG. 2 is a top plan view of the apparatus of FIG. 1.
Figure 3:
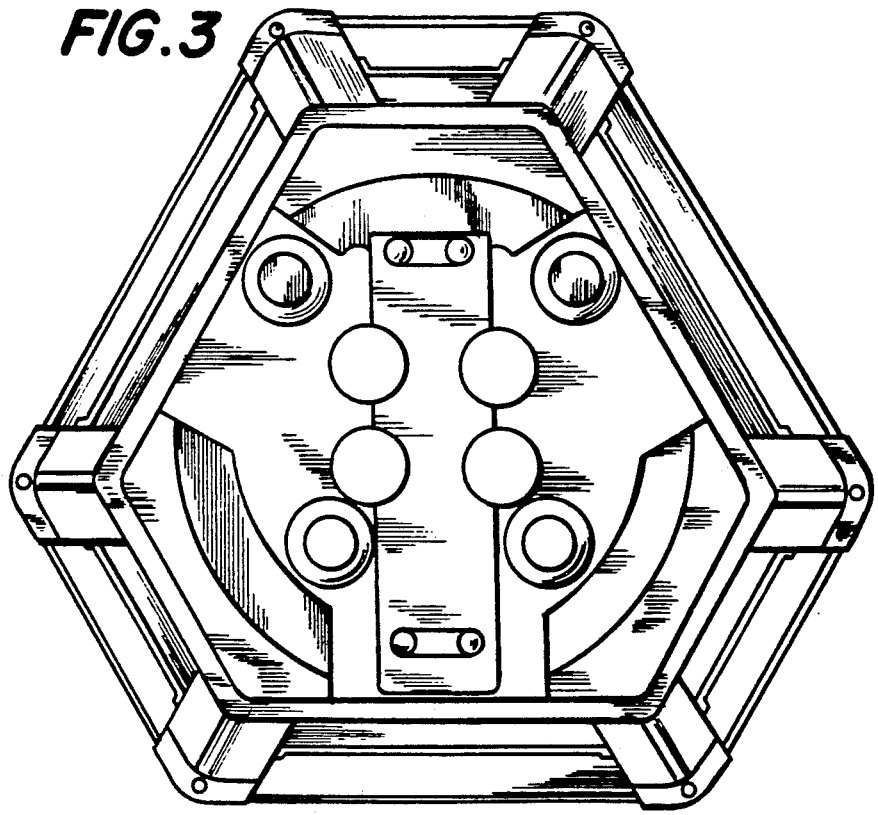
FIG. 3 is a bottom plan view thereof.

FIG. 1 shows apparatus 10 of the type to which the present invention is applicable. The apparatus 10 comprises a housing 12 having a lower base portion 14 and an upper cap portion 16, a hollow interior 18 (FIG. 4) in which plants (not shown) are grown and an exterior 20. Lighting means is provided comprising preferably three fluorescent lamps 22 (shown in fragmentary form) mounted within the interior 18 for stimulating growth of the plants. A cord set (not shown) enables connection to house current. The housing 12 is formed with a plurality of vacuum-metalized walls or panels 28 having interior surfaces 40. When illuminated by the lighting means 22, the walls or panels reflect a major proportion of light into the interior 18. The panes are alternately relatively wide and narrow, but all of the panels have the same height and thickness. The housing 12 is further formed with lower and upper vents to facilitate circulation of air through the interior 18. The lower vent substantially surrounds the lower portion 14 of the housing 12, and the upper vent substantially surrounds the upper portion 16 of the housing 12. The lower and upper vents are formed and located with respect to the lamps 22 and the walls 28 so as substantially to block the passage of light from the interior 18 to the exterior 20.

Since the walls 28 are vacuum-metalized, they function as one-way mirrors or one-way glasses. That is, they are clear and transparent or opaque and reflective as viewed, for example, from outside the apparatus 10, depending on whether or not they are illuminated by the lamps 22. There is no substantial escape of light from the interior 18 to the exterior 20 of the apparatus 10. When the lamps 22 are turned on, the vacuum-metalized walls 28 function as one-way mirrors that reflect most of the light emanating from the lamps into the interior 18 of the apparatus 10. Since the walls function as one-way mirrors, the lamps when turned on can be seen from the outside of the apparatus, as can the plants grown within the apparatus. This of course implies the transmission of a certain minimum amount of light by the walls. This is desirable since it enables researchers or other users of the apparatus visually to monitor the progress and condition of the plants without opening the apparatus.

The fluorescent lamps 22 are respectively mounted in closely-spaced-apart relation to the walls and particularly to selected walls. Each fluorescent lamp is U-shaped and mounted with the U inverted.

In the prior art, a support 46 is connected to the wall in spaced-apart relation to the socket and releasably engageable with the fluorescent light 22 for support thereof, as shown in FIGS. 4 and 5.

In accordance with present invention, the wall is formed with a recess 48 having a given length L in a first direction (for example, the horizontal direction). The support 47 is made of a flexible material and is formed with a stem 50, a clip 52 extending from one side of the stem 50 for embracing and supporting the fluorescent lamp 42, and a head 54 extending from another side of the stem 50 and engageable in the recess 48.

A pair of arms 56, 58 leads away from the head 54 and wall at first locations 60, 62 adjacent to and on either side of the stem 50 and towards the wall at second locations 64, 66 farther from and on either side of the stem 50.

A pair of feet 68, 70 are respectively at distal ends of the arms 56, 58 and engageable in the recess 48.

The feet 68, 70 have a separation in the first direction normally slightly different from the given length L and are resiliently biased by the arms 56, 58 for retention in the recess 48. Specifically, the separation of the feet 68, 70 can be normally slightly greater than or slightly less than the length L. If the separation of the feet 68, 70 is normally (i.e., in the unbiased state) slightly greater than the length L, then, when retained in the recess 48, the arms 56, 58 bias the feet 68, 70 outwardly, as indicated in FIG. 6. On the other hand, if the separation between the feet 68, 70 is normally less than the length L, then the recess 48 is formed with stop means (not shown) on the inner sides of the feet 68, 70, so that the feet 68, 70 can pull inwardly against such stop means and thereby be retained in the recess.

At least one of the head 54 and the feet 68, 70 is received in the recess 48 with a small tolerance in a direction orthogonal to the dimension L. When the dimension L is horizontal, the orthogonal direction is vertical. Both the head 54 and the feet 68, 70 are preferably received in the recess means 48 with a small tolerance in a direction orthogonal to the first direction represented by L. This accurately positions the clip means 52 in the vertical direction for optimum effect in positioning the lamp 22.

The recess 48 is preferably formed as a single recess, as illustrated. However, it can be formed as plurality of individual recesses, one accommodating the head 54, another accommodating the foot 68, and another accommodating the foot 70, all of the recesses together constituting a single "recess means."

In accordance with the invention, the cap portion 16 is preferably secured to the wall by a bolt 72, as shown in FIG. 7, so that the apparatus 10 can be lifted by means of a slot provided in the center of the cap and without the need to incorporate a separate strap 74 as indicated in FIG. 4. A plurality (e.g., six) of such bolts can be provided, one at the top of each corner where the sidewalls meet. Six similar bolts can be provided at the bottom of each corner where the sidewalls meet, in order to secure the walls of the base portion 14. This provides a strong housing with a minimum of bolts and makes it possible to eliminate the strap 74, thus making the manufacturing process more efficient.

By means of the structural alterations described above, particularly since the clip is formed of a resilient material and is shaped as described above, a complete accommodation to the mounting in the electrical socket is provided. Four such mounting units are preferably employed for each lamp, two units for each leg of the U, the two such units for a given leg of the U being vertically spaced apart (i.e., spaced apart in a direction orthogonal to the direction L in FIG. 6). The head 54 can "roll" to an extent in the recess 48, thereby accommodating any slight misalignment of the fluorescent lamp 22 by virtue of manufacturing tolerances in the mounting means. This is in contrast to the mounting shown in FIG. 5, in which the stem is held tightly on either side within a narrow channel and is not able to roll in the manner of the head 54 of FIG. 6. The prior mounting means may cause a permanent stress on the fluorescent tube 22 which can result in breakage of the tube in the event of rough handling during shipment. The more flexible structure of FIG. 6 is optimally adapted to compensate for manufacturing tolerances and to absorb the shock of rough handling in shipment. The apparatus of the invention is therefore better adapted than prior such apparatus to be accurately and completely assembled at the factory and to be shipped to the ultimate consumer with maximum assurance of its safe arrival.

Thus there is provided in accordance with the invention a novel and highly effective apparatus that attains the objects of the invention as outlined above. Many modifications of the preferred embodiment of the invention disclosed herein will readily occur to those skilled in the art. Accordingly, the invention is to be construed as including all modifications thereof that fall within the scope of the appended claims.

I claim:

1. In apparatus comprising a housing for growing plants under controlled conditions, said housing being defined by base means, wall means connected to the base means, and cap means connected to the wall means; electrical socket means connected to said housing means; fluorescent light means connected to said socket means; and support means connected to the wall means in spaced-apart relation to the socket means and releasably engageable with the fluorescent light means for support thereof; the improvement wherein:

the wall means is formed with non-apertured recess means having a given length in a first direction;
the support means is made of flexible material and comprises:
stem means,
clip means connected to and extending from one side of the stem means for embracing and supporting the fluorescent light means,
a head connected to and extending from another side of the stem means and engageable in said recess means,
a pair of arms connected to and leading away from the head and wall means at first locations adjacent to and on either side of the stem means and towards the wall means at second locations farther from and on either side of the stem means, and
a pair of feet respectively connected to distal ends of said arms and engageable in said recess means,
said feet having a separation in said first direction normally slightly different from said given length and being resiliently biased by said arms for retention in said recess means, and
at least one of said head and said feet being received in said recess means with a small tolerance in a direction orthogonal to said first direction.

2. Apparatus according to claim 1 wherein both said head and said feet are received in said recess means with a small tolerance in a direction orthogonal to said first direction.

3. Apparatus according to claim 1 wherein said recess means is formed as a single recess.

4. Apparatus according to claim 1 wherein said first direction is horizontal and said direction orthogonal to said first direction is vertical.

5. Apparatus according to claim 1 wherein said separation is normally slightly greater than said given length.

6. Apparatus according to claim 1 further comprising bolt means securing to said wall means to at least one of said cap means and said head means.

7. Apparatus according to claim 1 further comprising fastening means for fastening said cap means securely and directly to said wall means.

* * * * *